Nov. 10, 1931.   C. SMITH   1,831,081

HYDRAULIC BRAKING SYSTEM

Filed July 16, 1928

INVENTOR
CHARLES SMITH
BY J.H.G.Cook
ATTORNEY

Patented Nov. 10, 1931

1,831,081

UNITED STATES PATENT OFFICE

CHARLES SMITH, OF ST. LOUIS, MISSOURI

HYDRAULIC BRAKING SYSTEM

Application filed July 16, 1928. Serial No. 292,953.

This invention relates generally to hydraulic braking systems for motor vehicles and more specifically to an improved attachment for braking systems of this type, the predominant object of the invention being to produce a device which, when employed as a part of a hydraulic braking system for motor vehicles, will function to prevent entire loss of efficiency of the braking system when a fluid conductor or conductors leading to one or more, but less than all, of the brakes develops a leak.

Prior to this invention, a hydraulic braking system for motor vehicles included a plurality of conductors leading to the brakes associated with the various wheels of the motor vehicle. The conductors were arranged in communication with each other and as a result of this fact, a leak in any one of the conductors frequently resulted in the fluid being drained from the entire system whereby the braking system was rendered totally inoperative.

The purpose of the present invention is to produce a device one or more of which is associated with a hydraulic braking system of a motor vehicle. These devices are so constructed and arranged in the braking system that in the event a leak is produced in a conductor leading to the brake associated with a wheel of the motor vehicle so that the fluid within said conductor leaks therefrom, a valve element will automatically close said conductor so that same is shut off from the other fluid conductors, making up the remainder of the system. In this manner the fluid in all of the fluid conductors of the system, other than the particular fluid conductor in which the leak has developed, is prevented from leaking from said conductors and therefore, instead, the entire breaking system being rendered inoperative when a leak develops in a conductor, as heretofore only the particular brake to which the leaking fluid conductor leads is rendered inoperative. The advantage of this is that unless leaks develop in the fluid conductors leading to all of the brakes at the same time, sufficient braking power will be present to bring the motor vehicle to a halt in the event the braking system is disabled.

Figure 1:
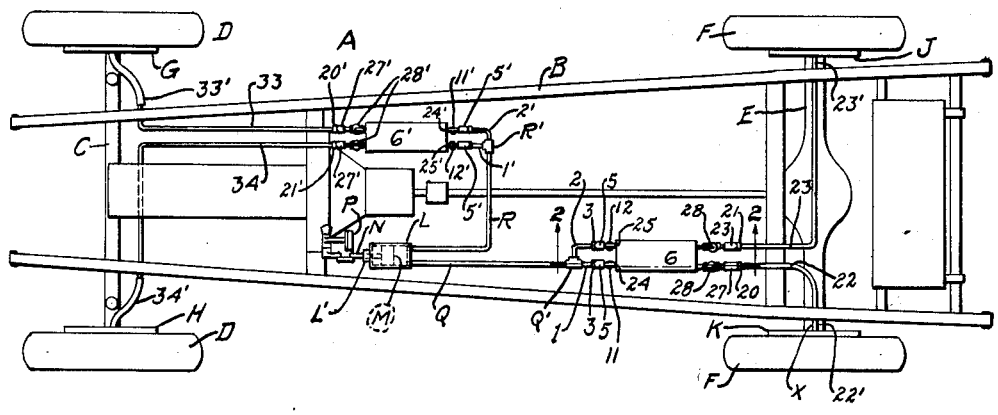
Figure 1 is a plan view, in more or less diagrammatical form showing the chassis of a motor vehicle provided with a hydraulic braking system which includes as parts thereof, a pair of my improved devices.

In the drawings which illustrate one embodiment merely of my invention, A designates the chassis of a motor vehicle, which chassis comprises the usual frame B front axle C, front wheels D, rear axle E and rear wheels F. All of these parts, which are well known, are assembled in the usual manner and each of the wheels of the chassis is provided with a brake, the brakes associated with the front wheels being designated in the drawings by the reference characters G and H, while the brakes associated with the rear wheels are designated by the reference characters J and K. In so far as this invention is concerned, there is nothing unique about the construction of the brakes, said brakes being of the type commonly employed in hydraulic braking systems.

L designates a cylindrical housing in which a piston M is arranged for reciprocatory movement, said cylindrical housing being closed at its opposite ends by walls. Extended through a stuffing box L', located at an opening formed through one end wall of the cylindrical housing L is a piston rod N, said piston rod being cooperatively attached to a foot lever mechanism P whereby depression of the foot lever will result in movement of the piston M in a direction longitudinally of the cylindrical housing L.

Q designates a fluid conductor which communicates with the interior of the cylindrical housing L through the end wall thereof opposite to the end wall of said cylindrical housing through which the piston rod N extends. The fluid conductor Q is arranged so that the end thereof opposite to the end communicating with the interior of the cylindrical housing L communicates with a T-fitting Q'.

1 and 2 designate relatively short fluid conductors which communicate with legs of the T-fitting Q', the short conductor 2 having an angular formation as shown in Figure 1. The short conductors 1 and 2 communicate with T-fittings 3, one of said T-fittings being associated with the short conductor 1 and another similar T-fitting being associated with the short conductor 2. Extended upwardly from each of the T-fittings 3 is a nipple 4, said nipples 4 communicating at their upper ends with elbows 5.

Figure 3:
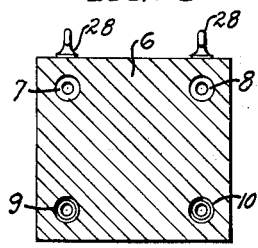
Figure 3 is a cross section on line 3—3 of Figure 2.
Figure 4:
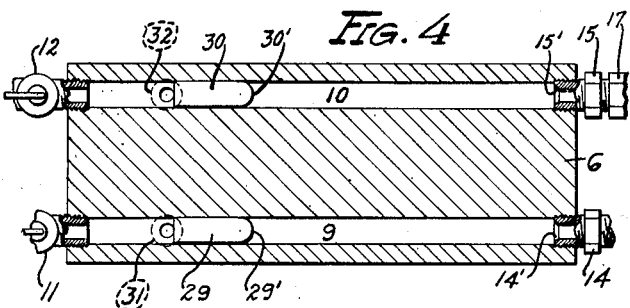
Figure 4 is a section on line 4—4 of Figure 2.

6 designates one of my improved devices which comprises an elongated bar-like member rectangular in cross section as shown in Figure 3. Adjacent to the four corners of the member 6 when viewed in cross section as in Figure 3, are four passageways, 7, 8, 9 and 10, said passageways being extended from end to end of the device 6. The passageways 7, 8, 9 and 10 at the opposite ends thereof are provided with screw-threads.

Screwed respectively into the screw-threaded ends of the passageways 9 and 10, are the screw-threaded extensions of a pair of valves 11 and 12, said valves being arranged in communication at their opposite ends with the T-fittings 3 through the instrumentality of a pair of nipples 3'. In view of this arrangement, it is plain that the passageways 9 and 10 are in communication with the fluid conductors 1 and 2 and it is likewise obvious that communication between said conductors 1 and 2 and said passageways 9 and 10 may be closed by moving the valves 11 and 12 to closed positions.

Screwed into the ends of the passageways 9 and 10, opposite to the ends thereof, at which the valves 11 and 12 are located are nipples 14 and 15, to which coupling members 16 and 17 are connected. The coupling members 16 and 17 at their opposite ends receive nipples 18 and 19, said nipples 18 and 19 in turn being screwed into T-fittings 20 and 21. Screwed into the T-fitting 20 and 21 at opposite sides thereof, to those at which the nipples 18 and 19 are located, are fluid conductors 22 and 23, the fluid conductors 22 leading from the said fitting 20 to the brake K and the fluid conductor 23 leading from the T-fitting 21 to the brake J. At the points where the fluid conductors 22 and 23 are connected to the brakes referred to, I employ a pair of flexilbe members 22' and 23' to take care of the relative movement of the brakes with respect to the fluid conductors 22 and 23.

24 and 25 designate nipples which are screwed into the passageways 7 and 8, said nipples 24 and 25 placing said passageways in communication with the fluid conductors 1 and 2 through the instrumentality of the T-fittings 3, nipples 4, elbows 5, and nipples 24 and 25. In like manner, the fluid conductors 22 and 23 are arranged in communication with the passageways 7 and 8 at the ends thereof opposite to the ends at which the nipples 24 and 25 are located, communication between said passageways 7 and 8 and said fluid conductors 22 and 23 being established by nipples 26 communicating with the T-fittings 20 and 21 elbows 27, and valve housings 28, which are screwed into the ends of the passageways 7 and 8 and in which valve mechanisms are arranged.

29 and 30 designate valve elements which are arranged respectively within the passageways 9 and 10, said valve elements being in the form of elongated cartridges having rounded ends 29' and 30' and being capable of movement longitudinally of said passageways. The portions of the nipples 14 and 15 which screw into the device 6 are provided with valve seats 14' and 15' against which the rounded ends 29' and 30' of the valve elements are adapted to be seated.

31 and 32 designate cocks which are screwed into ports formed in the device 6, said ports communicating with the passageways 9 and 10 respectively. The cocks 31 and 32, of course, including valve mechanism whereby passage of fluid through said cocks may be permitted or prevented.

6' designates a second one of my improved devices which is identical with the device 6 already described and is associated with the fluid conductors leading to the brakes associated with the front wheels of the chassis A, said conductors including a fluid conductor R having an angular formation and leading from the cylindrical housing L to the T-fitting R'. Leading from the T-fitting R' are short fluid conductors 1' and 2', said conductors 1' and 2' being arranged in communication with the lower passageways formed through the device 6' by elements which include the valves 11' and 12' and said conductors 1' and 2' being arranged in communication with the upper passageways formed through the device 6' by connected elements which include the elbows 5' and nipples 24' and 25'.

33 and 34 designate fluid conductors which lead respectively to the brakes G and H, said conductors being connected to said brakes by flexible conductors 33' and 34'. The fluid conductors 33 and 34 are arranged in communication with the lower passageways of the device 6' by connected elements which include the T-fittings 20' and 21' and said fluid conductors are arranged in communication with the upper passageways of the device 6' by connected elements which include the elbows 27' and the valve housings 28' in which valve mechanisms are located. The lower passageways of the device 6' are provided with valve elements resembling the valve elements 29 of the device 6 and said lower passageways have associated therewith cocks resembling the cocks 31 and 32 already described, which cocks communicate with the interiors of said lower passageways.

In the operation of a hydraulic braking system of a motor vehicle which includes my improved devices, pressure by the operator on the foot lever P will cause the piston M to be moved longitudinally within the cylindrical housing L whereby fluid within the fluid conductors leading to the various brakes and within the fluid passageways in the valve devices 6 and 6' will be forced through said conductors and passageways toward the brakes G, H, J and K, whereby said brakes will be operated in the usual manner to halt the motor vehicle.

As already stated the fluid conductors leading to the various brakes are connected to the respective brakes by means of flexible connectors and these flexible connectors frequently develop leaks, which, when the braking systems were constructed as heretofore, permitted the fluid to drain from the entire braking system, whereby same was rendered inoperative. When a braking system is provided with my improved valve devices however, a leak produced in one of the flexible connectors will result in the fluid conductor of which the defective flexible connector forms a part being closed by the associated valve element 29 or 30, and therefore the fluid is maintained in the other fluid conductors of the braking system whereby all of the brakes of the system except the one associated with the defective connector are capable of efficient operation.

When a leak is produced in a flexible connector, or in the fluid conductor associated therewith, the fluid within said conductor will start to drain therefrom through said leak and therefore, the pressure on one side of the associated valve element 29 or 30 will drop below normal. The pressure of the fluid on the opposite side of the valve element being greater will move said valve element longitudinally of the pasageway and into contact with the associated valve seat 14' or 15' whereby the defective fluid conductor will be closed by said valve element. In this manner, any fluid conductor leading to a brake which develops a leak, is disconnected from, or "cut out" of the system, and the remainder of the system continues to function in an entirely efficient manner.

Figure 2:
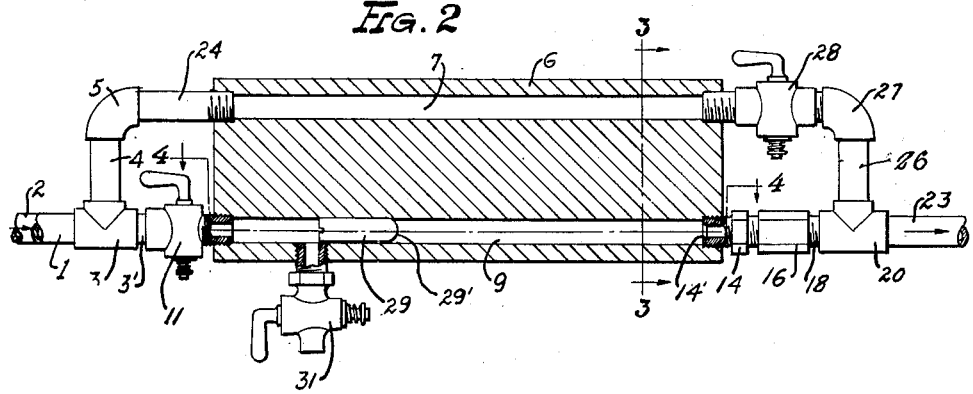
Figure 2 is a section on an enlarged scale, taken on line 2—2 of Figure 1.

After a leak has developed in a fluid conductor, for instance at the point indicated by the reference character X in Fig. 1, and same has been repaired and it is desired to unseat the valve element associated with the repaired fluid conductor and renew the supply of fluid in said repaired conductor, the valve 11, Fig. 2, will be closed and the valve 28, which during the normal operation of the system is closed, will be opened. Fluid will then be forced into the cylindrical housing L in the usual manner and this fluid will flow through the conductor Q to the T-fitting 3 and because the valve 11 is closed, said fluid will flow through the nipples 4 and 24 and elbow 5 into and through the passageway 7 in the valve device 6. The fluid referred to will flow through the open valve 28, elbow 27, nipple 26 and T-fitting 20 into the repaired fluid conductor 22 until said conductor is filled with fluid. During the refilling operation, the cock 31 is open, which condition permits the fluid between the closed valve 11 and the valve element 29 to drain from the passageway 10 and when the conductor 22 has been filled with fluid in the manner described the fluid passing through the by-pass, comprising the valve 28, elbow 27, nipple 26, and T-fitting 20 will back up in the passageway 10 thus unseating the valve element 29 and moving same toward the opposite end of the passageway 10. The movement of the valve element 29 will continue until said valve element reaches the end of the passageway at which the valve 11 is located and when this point is reached, a dripping of fluid from the cock 31 will notify the operator that the proper amount of fluid has been introduced into the system. The cock 31 is then closed as is the valve 28 and the valve 11 is opened whereupon the braking system will again be ready for operation.

I claim:

1. In combination with a motor vehicle having a hydraulic braking system including a plurality of fluid conductors leading to brakes associated with the various ground wheels of the motor vehicle, automatically operated valve elements located entirely within the fluid conductors leading to the respective brakes, said automatically operated valve elements being capable of unrestrained movement in either direction within said conductors and being arranged to close the fluid conductors with which same are associated in the event any of the brake operating fluid therein leaks therefrom, valves for controlling the flow of fluid at one side of the automatic valve elements, and by-passes arranged about the portions of the conductors in which the automatic valve elements operate.

2. In combination with a motor vehicle having a hydraulic braking system including a plurality of fluid conductors leading to brakes associated with the various ground wheels of the motor vehicle, pressure controlled valve elements located entirely within the fluid conductors leading to the respective brakes, said pressure controlled valve elements being capable of unrestrained movement in either direction within said conductors and being arranged to close the fluid conductors with which same are associated in the event the pressure of the brake operating fluid therein drops below normal, valves for controlling the flow of fluid at one side of the pressure controlled valve elements, and by-passes arranged about the portions of the conductors in which the pressure controlled valve elements operate.

3. In combination with a motor vehicle having a hydraulic braking system including a plurality of fluid conductors leading to brakes associated with the various ground wheels of the motor vehicle, valve devices associated with the fluid conductors leading to the respective brakes, said valve devices including each a valve element interposed between bodies of fluid of approximately corresponding pressures a valve seat located entirely within a fluid conductor leading to a brake, said valve element being capable of unrestrained movement in either direction within said fluid conductor and being adapted to move into contact with said valve seat when the fluid pressure in said fluid conductor and at one side of said valve element drops below normal, whereby the fluid conductor in which the pressure has dropped is closed, a valve for controlling the flow of fluid at one side of said valve element, and a by-pass arranged about said valve element.

4. In combination with a motor vehicle having a hydraulic braking system including a plurality of fluid conductors leading to brakes associated with the various ground wheels of the motor vehicle, valve devices located entirely within the fluid conductors leading to the respective brakes, said valve devices including each a valve housing, a valve element located in a passageway formed through said valve housing and movable longitudinally with respect thereto in response to movement of fluid within said passageway, a valve seat at an end of said passageway and arranged in association with a fluid conductor leading to a brake, said valve element being capable of unrestrained movement in either direction within said fluid conductor and being interposed between bodies of fluid within the passageway in the valve housing of approximately corresponding pressures and said valve element being movable into contact with said valve seat when the fluid pressure in the fluid conductor with which the valve seat is associated drops below normal, a valve for controlling the flow of fluid at one side of said valve element, and a by-pass arranged about said valve element.

5. In combination with a motor vehicle having a hydraulic braking system including a plurality of fluid conductors leading to brakes associated with the various ground wheels of the motor vehicle, a valve device associated with the fluid conductors leading to a pair of brakes, and a second valve device associated with the fluid conductors leading to a second pair of brakes, each of said valve devices comprising a valve housing provided with a pair of fluid passageways formed therein arranged in communication with the respective fluid conductors associated with said valve device, valve elements arranged in said fluid passageways and movable longitudinally with respect thereto, in response to movement of fluid within said passageways, valve seats at ends of said passageways and arranged in association with fluid conductors leading to the pair of brakes with which the valve device is associated, said valve elements being interposed between bodies of fluid within the passageways of approximately corresponding pressures and said valve elements being movable into contact with said valve seats when fluid pressure in the fluid conductors with which the valve seats are associated drops below normal, valves for controlling the flow of fluid at one side of said valve elements, by-passes arranged about said valve elements, and valves for draining fluid from portions of the passageways at one side of the valve elements.

In testimony that I claim the foregoing I hereunto affix my signature.

CHARLES SMITH.